US010768010B2

(12) United States Patent
Mendla et al.

(10) Patent No.: US 10,768,010 B2
(45) Date of Patent: Sep. 8, 2020

(54) SYSTEM AND METHOD FOR TRIP RANDOMIZATION AND GAMIFICATION

(71) Applicant: GM Global Technology Operations LLC, Detroit, MI (US)

(72) Inventors: Zachary S. Mendla, Shelby Township, MI (US); Yue Fan, Troy, MI (US); Mike Aljamal, Macomb, MI (US); Marco J. Gatti, Grosse Ile, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 16/030,080

(22) Filed: Jul. 9, 2018

(65) Prior Publication Data

US 2020/0011699 A1 Jan. 9, 2020

(51) Int. Cl.
*G01C 21/36* (2006.01)
*G06F 3/0481* (2013.01)
*G01C 21/34* (2006.01)

(52) U.S. Cl.
CPC ..... *G01C 21/3667* (2013.01); *G01C 21/3453* (2013.01); *G01C 21/3484* (2013.01); *G01C 21/3611* (2013.01); *G01C 21/3617* (2013.01); *G06F 3/04817* (2013.01)

(58) Field of Classification Search
CPC ............ G01C 21/3667; G01C 21/3453; G01C 21/3484; G01C 21/3617; G01C 21/3611; G01C 21/3605; G01C 21/3476; G06F 3/04817
USPC ........................................................ 701/424
See application file for complete search history.

(56) References Cited

U.S. PATENT DOCUMENTS

| 2016/0214612 | A1* | 7/2016 | Kashiba | B60W 30/18163 |
| 2016/0259334 | A1* | 9/2016 | Hashimoto | G05D 1/0061 |
| 2018/0181128 | A1* | 6/2018 | Urano | G01C 21/3617 |
| 2018/0224852 | A1* | 8/2018 | Tanahashi | G05D 1/0274 |
| 2018/0224858 | A1* | 8/2018 | Watanabe | G05D 1/0088 |

* cited by examiner

*Primary Examiner* — Muhammad Shafi (57) ABSTRACT

A destination selection system for determining travel destinations includes a human-machine interface (HMI); a positioning system in communication with the HMI; a controller in communication with the HMI and the positioning system, the controller having a processor, and a memory, the processor executing programmatic logic stored in the memory. The programmatic logic includes a first logic to display an icon on the HMI based on position data received from the positioning system; and a second logic for sizing the icon based on at least one of the position data and one or more additional factors, and in response to at least one of the position data and one or more additional factors actively and continuously resizing the icon.

15 Claims, 6 Drawing Sheets

SYSTEM AND METHOD FOR TRIP RANDOMIZATION AND GAMIFICATION

INTRODUCTION

The statements in this section merely provide background information relating to the present disclosure, and may not constitute prior art.

The present disclosure relates to motor vehicles, and more specifically to motor vehicles equipped with internet and/or telecommunications-connected navigation systems. As navigation systems have become more sophisticated and interconnected with mobile devices, and with resources on the internet, a wide variety of data can be collected and provided to users of the navigation systems. However, the sheer amount of data that can be presented to a user via the mobile devices and/or human-machine interfaces (HMIs) within the vehicle can be daunting. Moreover, the data is often a display of information related solely to specific search terms, generated by the user. As a result, while data, such as points of interest, may be accessible by the user of a typical motor vehicle HMI or navigation system on an HMI or mobile device, the data may be so plentiful that decision fatigue, distracted driving, and the like may result. Therefore, while current navigation systems and the HMIs and mobile devices on which navigation systems display achieve their intended goals, there is a need in the art for new and improved destination selection systems and methods for determining travel destinations that reduce decision fatigue, improve the availability and accessibility of destination data, increase spontaneity and interest in driving, and more precisely tailor destination selection results to each user.

SUMMARY

According to several aspects a destination selection system for determining travel destinations includes: a human-machine interface (HMI); a positioning system in communication with the HMI; a controller in communication with the HMI and the positioning system, the controller having a processor, and a memory, the processor executing programmatic logic stored in the memory, the programmatic logic includes: a first logic to display an icon on the HMI based on position data received from the positioning system; and a second logic for sizing the icon based on at least one of the position data and one or more additional factors, and in response to at least one of the position data and one or more additional factors actively and continuously resizing the icon.

In another aspect of the present disclosure the programmatic logic further includes: a third logic for receiving a first user input accessing the destination selection system within the HMI; a fourth logic for presenting a destination selection management interface having at least two selectable functions including a keyword function and a randomization function; a fifth for receiving a second user input to select one of the at least two functions of the destination selection management interface; a sixth logic for presenting on the HMI information relating to the selected function; a seventh logic for logic for receiving a third user input to direct the destination selection system to select a destination; and an eighth logic for presenting a status of the host vehicle as the host vehicle navigates to the selected destination.

In yet another aspect of the present disclosure the third logic further includes selecting the destination selection system in an HMI of the host vehicle or selecting a destination selection system on a mobile device.

In yet another aspect of the present disclosure the third input further includes selection of a destination icon displayed in the destination selection system.

In yet another aspect of the present disclosure the eighth logic further includes selectively displaying map information, the destination selection interface, or the destination selection system, including points of interest actively and continuously sized and highlighted in relationship to proximity to the host vehicle.

In yet another aspect of the present disclosure the fourth logic further includes selectively presenting a plurality of destination icons relating to the selected function and selectively highlighting the plurality of destination icons based on host vehicle user preferences.

In yet another aspect of the present disclosure the host vehicle user preferences further include manually selected preferences and automatically generated preferences, and the automatically generated preferences further include destination types selected in relationship to usage history, present location, route usage, social information, vehicle range information, vehicle maintenance information, traffic conditions, event information, promotional information, landmarks, time of day, housing information, and product order history information.

In yet another aspect of the present disclosure the first logic further includes: calculating a ranking for each of the plurality of destination icons; determining if a threshold ranking value has been achieved; displaying destination icons if the threshold ranking value has been achieved.

In yet another aspect of the present disclosure the second logic further includes: calculating a sum of: distance multiplied by a first coefficient and a first entropy factor; time multiplied by a second coefficient and a second entropy factor; cost multiplied by a third coefficient and a third entropy factor; social information multiplied by a fourth coefficient and a fourth entropy factor; filtering the plurality of destination icons based on plurality of user factors, vehicle and road factors, user inferences, and events available; and actively sizing and actively highlighting the displayed destination icons in accordance with the ranking of each of the displayed destination icons.

In yet another aspect of the present disclosure a method for determining travel destinations for a host vehicle includes: receiving a first input to access a destination selection system; presenting a destination selection management interface having at least two selectable functions including a keyword function and a randomization function; receiving a second input to select one of the at least two functions of the destination selection system; presenting information relating to the selected function; receiving a third input to direct the destination selection system to select a destination; presenting a status of the host vehicle as the host vehicle navigates to the selected destination.

In yet another aspect of the present disclosure receiving the first input further includes selecting a destination selection system in an HMI of the host vehicle or selecting a destination selection system on a mobile device.

In yet another aspect of the present disclosure presenting the destination selection management interface further includes selectively presenting a plurality of destination icons relating to the selected function and selectively highlighting the plurality of destination icons based on host vehicle user preferences.

In yet another aspect of the present disclosure selectively presenting and selectively highlighting the plurality of destination icons further includes: calculating a ranking for each of the plurality of destination icons; determining if a threshold ranking value has been achieved; displaying destination icons if the threshold ranking value has been achieved; and actively sizing and actively highlighting the displayed destination icons in accordance with the ranking of each of the displayed destination icons.

In yet another aspect of the present disclosure calculating a ranking further includes calculating a sum of: distance multiplied by a first coefficient and a first entropy factor; time multiplied by a second coefficient and a second entropy factor; cost multiplied by a third coefficient and a third entropy factor; social information multiplied by a fourth coefficient and a fourth entropy factor; and filtering the plurality of destination icons based on plurality of user factors, vehicle and road factors, user inferences, and events available.

In yet another aspect of the present disclosure the host vehicle user preferences further include manually selected preferences and automatically generated preferences.

In yet another aspect of the present disclosure the automatically generated preferences further include destination types selected in relationship to usage history, present location, route usage, social information, vehicle range information, vehicle maintenance information, traffic conditions, event information, promotional information, landmarks, time of day, housing information, and product order history information.

In yet another aspect of the present disclosure receiving a third input further includes selecting a destination icon displayed in the destination selection system.

In yet another aspect of the present disclosure presenting a status of the host vehicle as the host vehicle performs the selected function further includes selectively displaying map information, the destination selection interface, or the destination selection system, including points of interest actively and continuously sized and highlighted in relationship to the rankings of each of the points of interest.

In yet another aspect of the present disclosure a method for determining travel destinations for a host vehicle includes: receiving a first input to access a destination selection system in an HMI of the host vehicle or selecting a destination selection system on a mobile device; presenting a destination selection management interface having at least two selectable functions including a keyword function and a randomization function; receiving a second input to select one of the at least two functions of the destination selection management interface, selectively presenting a plurality of destination icons relating to the selected function and selectively highlighting the plurality of destination icons based on host vehicle user preferences, the host vehicle user preferences including manually selected preferences and automatically generated preferences; calculating a ranking for each of the plurality of destination icons; determining if a threshold ranking value has been achieved; displaying destination icons if the threshold ranking value has been achieved; and highlighting the displayed destination icons in accordance with the ranking of each of the displayed destination icons; presenting information relating to the selected function; receiving a third input to direct the destination selection system to select a destination by selecting a destination icon displayed in the destination selection system; presenting a status of the host vehicle as the host vehicle navigates to the selected destination including selectively displaying map information, the destination selection interface, or the destination selection system, including points of interest actively and continuously sized and highlighted in relationship to proximity to the host vehicle, calculating a ranking further includes calculating a sum of: distance multiplied by a first coefficient and a first entropy factor; time multiplied by a second coefficient and a second entropy factor; cost multiplied by a third coefficient and a third entropy factor; social information multiplied by a fourth coefficient and a fourth entropy factor; and filtering the plurality of destination icons based on plurality of user factors, vehicle and road factors, user inferences, and events available.

In yet another aspect of the present disclosure the automatically generated preferences further include destination types selected in relationship to usage history, present location, route usage, social information, vehicle range information, vehicle maintenance information, traffic conditions, event information, promotional information, landmarks, time of day, housing information, and product order history information, and the actively and continuously sized and highlighted points of interest are continuously and recursively resized and highlighted in relation to the rankings of each of the points of interest.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Referring to FIGS. 1-3B, a system and method for trip randomization and gamification within a host vehicle is shown and indicated generally by reference number 10. The system 10 is used with an exemplary host vehicle 12 and/or an exemplary mobile device 14. While the host vehicle 12 is depicted as a car, it should be understood that the host vehicle 12 may be a car, a truck, an SUV, a van, a motor home, a semi, a tractor, a bus, a go-kart, or any other such motor vehicle without departing from the scope or intent of the present disclosure. The mobile device 14 is preferably a mobile phone, however, the mobile device 14 may be a mobile computer, laptop, tablet, smart watch, personal activity tracker, or any other such device in wireless communication with the host vehicle 12. The host vehicle 12 includes a trip randomization and gamification system 10 accessible via at least one human machine interface (HMI) 18 disposed in either the host vehicle 12, the mobile device 14, or both.

Figure 1:
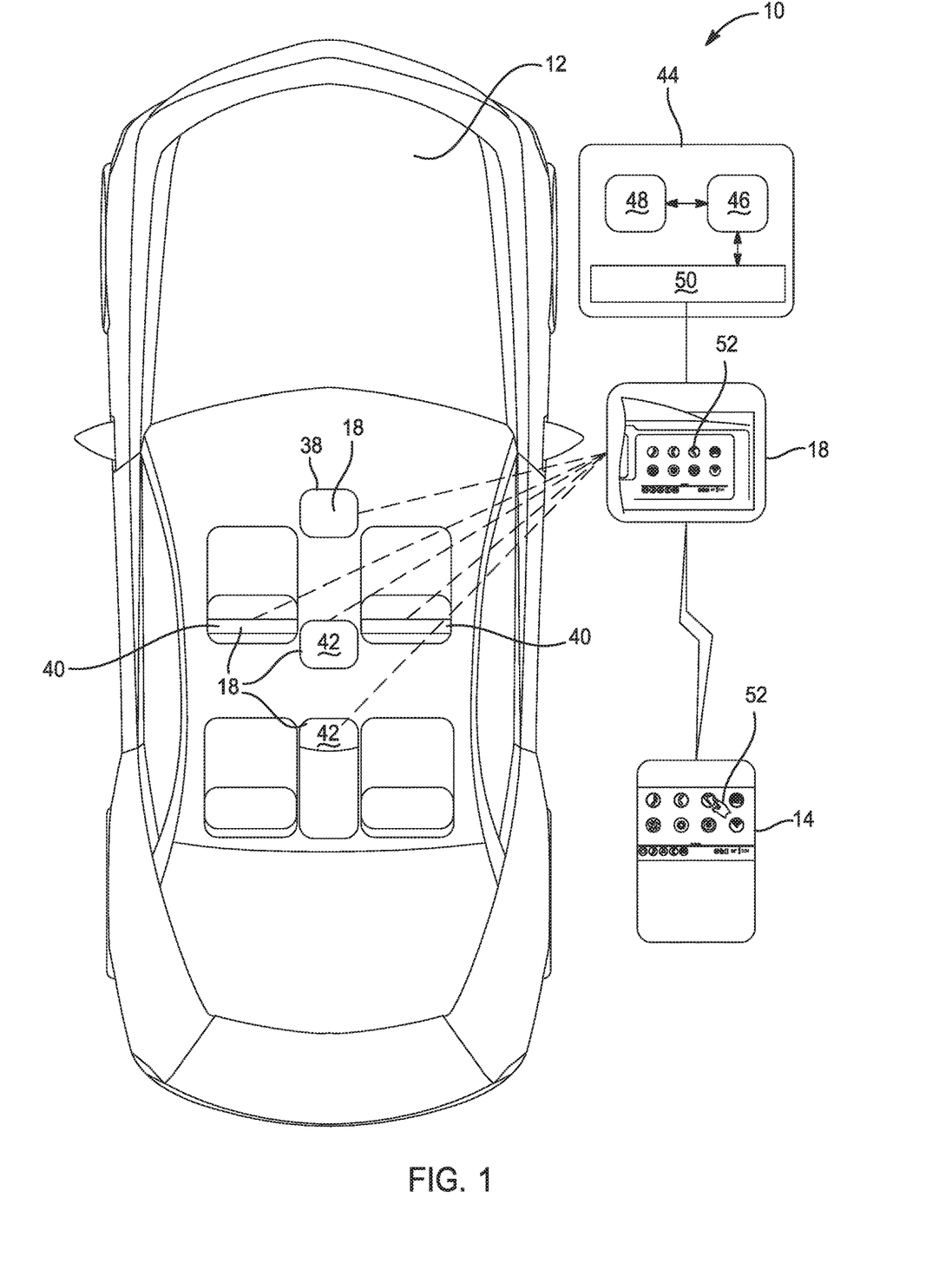
FIG. 1 is an environmental view of a motor vehicle equipped with a destination selection system according to an aspect of the present disclosure.
Figure 2:
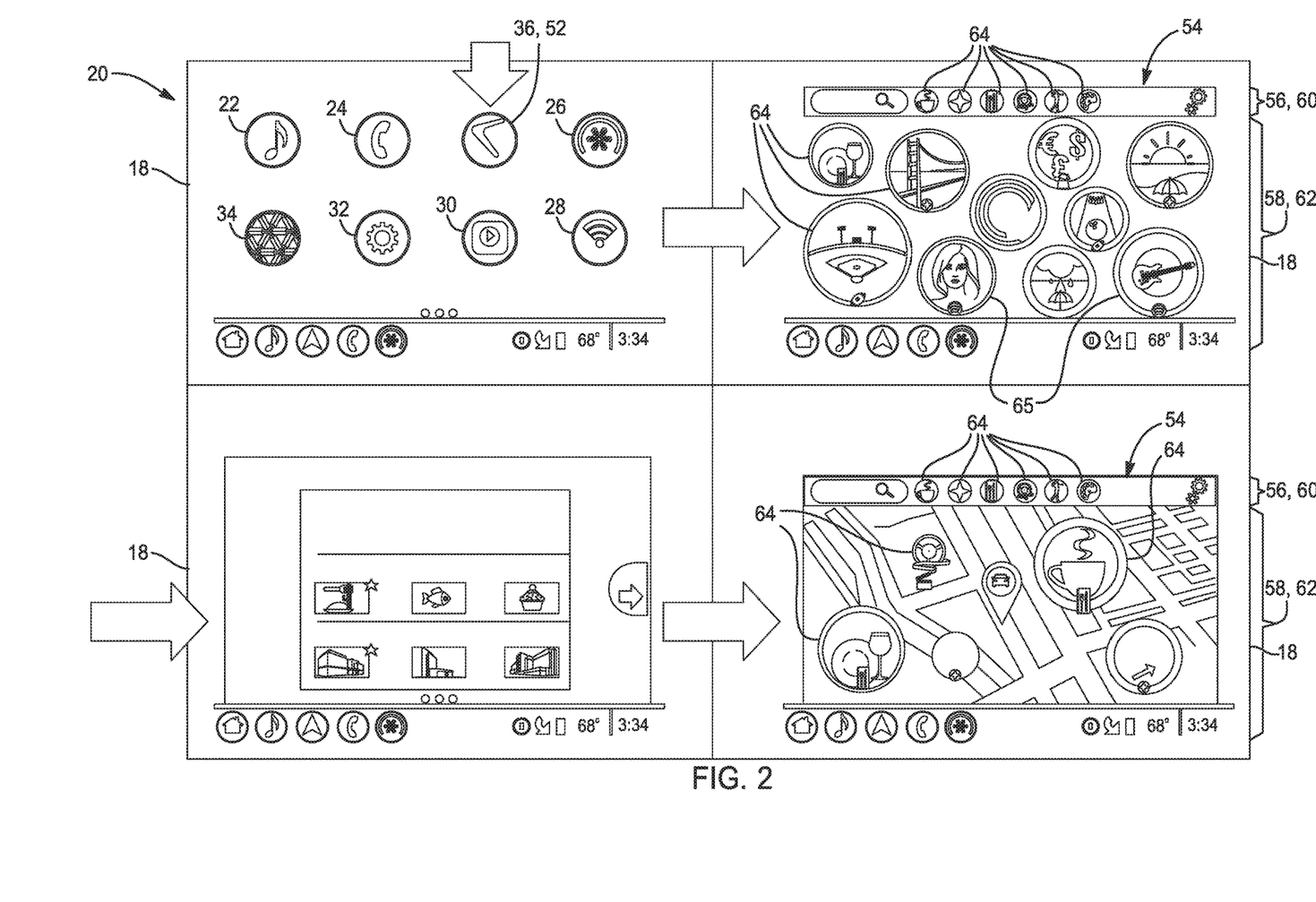
FIG. 2 is an image of a human-machine interface (HMI) providing access to a destination selection system according to an aspect of the present disclosure.

Within the host vehicle 12, the HMI 18 provides user access to a variety of systems and sub-systems 20 of the host vehicle 12, including the trip randomization and gamification system 10. In several aspects, the HMI 18 communicates with and provides user access to audio systems 22, telephonic or other communications systems 24, climate control systems 26, wireless connectivity systems 28 such as Bluetooth or WiFi Hotspots, integrated mobile operating systems 30 such as Apple Car Play, Android Auto, or the like. In still other aspects, the HMI 18 communicates with and provides access to HMI settings 32, user settings 34, and navigation systems 36. In some examples, the HMI 18 is disposed in a head unit or center console 38 of the interior of the host vehicle 12. In other examples, the HMI 18 is disposed in front seat headrests 40, a rear console 42, or the like. In still further examples, the trip randomization and gamification system 10 is accessed as a mobile application loaded on a user's mobile device 14. In some aspects, the systems and sub-systems 20 accessible through the HMI 18 or the mobile device 14 are controlled and operated by individual electronic controllers 44.

The electronic controllers 44 are non-generalized, electronic control devices having preprogrammed digital computer or processor 46, memory or non-transitory computer readable medium 48 used to store data such as control logic, instructions, image data, lookup tables, etc., and a plurality of input/output peripherals or ports 50. The processor 46 is configured to execute the control logic or instructions. The controller 44 may have additional processors 46 or additional integrated circuits in communication with the processor 46, such as perception logic circuits for analyzing sensor data, user input data, user preference data, traffic data, temperature data, navigational data, or the like. In some examples, the quantity of controllers 44 necessary to manage and control the systems and sub-systems 20 of the host vehicle may vary. That is, in one example, each of the systems and sub-systems 20 are controlled and operated by individual controllers 44, while in other examples, a single centralized controller 44 controls and operates all of the systems and sub-systems 20 in the host vehicle 12. In other words, the ratio of controllers 44 to systems and sub-systems 20 in a given host vehicle 12 may vary from less than a 1:1 ratio to a greater than 1:1 ratio. In addition in some examples, the controller 44 or controllers 44 communicate with systems external to the host vehicle 12. For example, a controller 44 for the navigation system 36 interacts with global positioning systems, satellites and the like. In another example, the controller 44 for the HMI 18 interacts with cloud computing systems having access to a variety of user/operator preferences hosted in such cloud computing systems or the like.

Figure 3A:
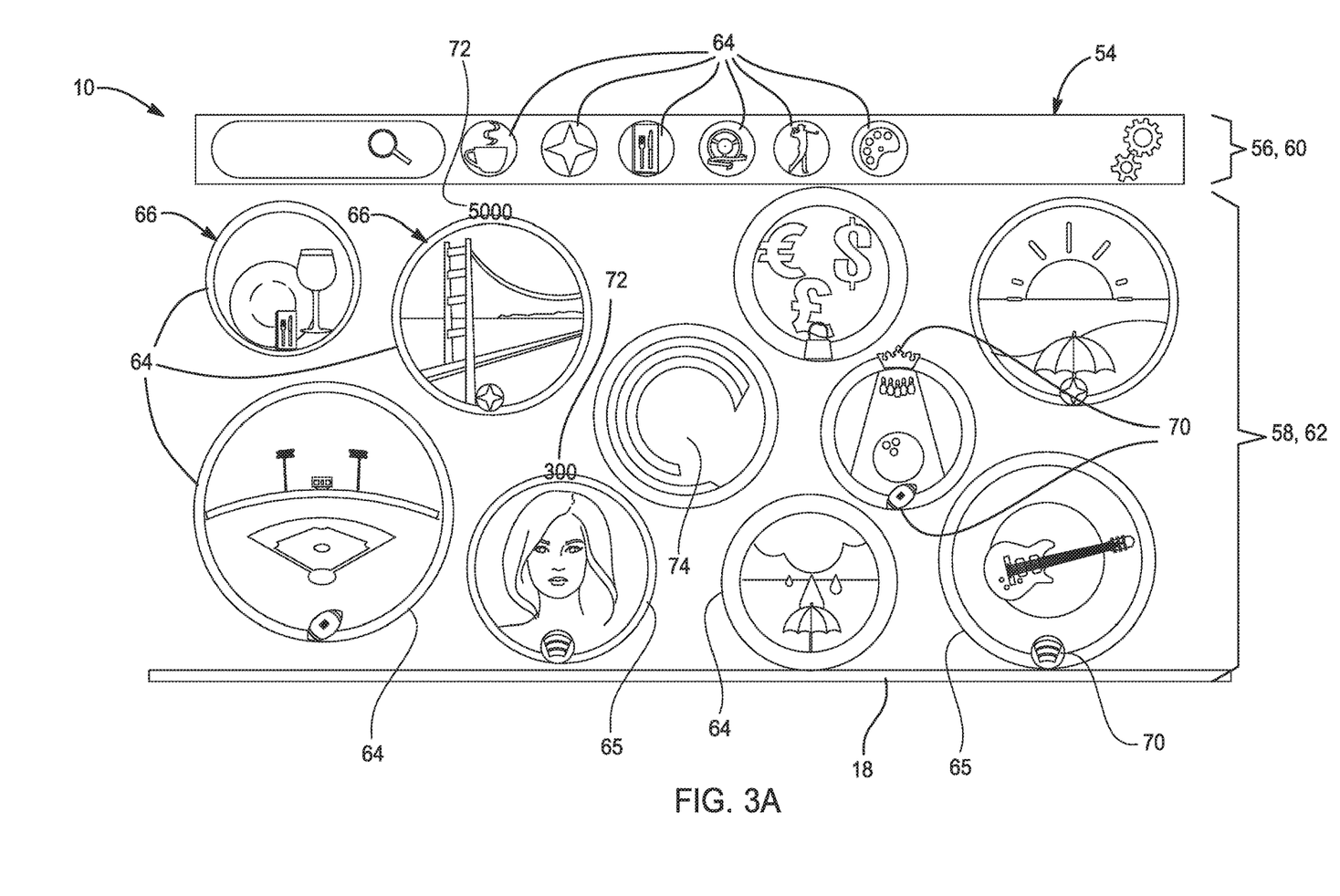
FIG. 3A is an image of an HMI displaying a destination selection system according to an aspect of the present disclosure.

The trip randomization and gamification system 10 operates as a destination selection system that aids the user or operator of the system 10 in determining travel destinations for the host vehicle 12. As mentioned above, the system 10 is accessible as an application within the HMI 18 or mobile device 14, when a user or operator selects a corresponding application icon 52 on the HMI 18 or the mobile device 14. When the user selects the application icon 52 for the trip randomization and gamification system 10, the controller 44 executes a first control logic to access the destination selection system. In some aspects, the application icon 52 is associated with the navigation system 36 of the host vehicle 12. The trip randomization and gamification system 10. The controller 44 then executes a second control logic and presents on the HMI 18 a destination selection management interface 54 having at least two selectable functions. In several aspects, the at least two selectable functions are displayed as a keyword function or keyword access display bar 56, and a randomized function or randomized display 58.

The keyword access display bar 56 is a persistent first portion 60 of the HMI 18 or mobile device 14 screen showing a predetermined set of keyword destination icons or destination icon types. In several aspects, the predetermined set of destination icons or destination icon types includes predetermined favorites associated with a given user or vehicle. That is, the keyword destination icons or destination icon types include user-set parameters such as favorite destinations for food, fuel, indoor and outdoor activities, automotive maintenance, music or other entertainment, and the like. For example, the keyword destination icons of a given user might include a favorite local coffee shop, a favorite tailor, a favorite gas station, a favorite golf course, a favorite sporting arena, or the like without departing from the scope or intent of the present disclosure. The persistent first portion 60 remains displayed on the HMI 18 or mobile device 14 while other functions of the HMI 18 or mobile device 14 are displayed as the user or operator navigates the trip randomization and gamification system 10.

The randomized function or randomized display 58 is a variable second portion 62 of the HMI 18 or mobile device 14 screen selectively displaying a plurality of destination icons 64. In several aspects, the plurality of destination icons is selected in accordance with a ranking. The controller 44 generates the ranking by taking into account a variety of factors associated with each of the plurality of destination icons 64. The ranking is a combination of one or more factors including a sum of distance from the host vehicle 12 multiplied by a first coefficient and a first entropy factor; travel time and/or host vehicle 12 range multiplied by a second coefficient and a second entropy factor; monetary or other cost multiplied by a third coefficient and a third entropy factor; and social media information multiplied by a fourth coefficient and a fourth entropy factor. In several aspects, the first, second, third, and fourth coefficients are variable and relate to the particular preferences of a particular user. Thus, for example, the distance from the host vehicle 12 may be weighted heavily by the first coefficient if the particular user has expressed a distinct distaste for traveling long distances. Therefore, in the example, potential destination that are outside a predetermined distance will be less likely to be shown to the user. That is, destination icons 64 are only displayed on the HMI 18 or mobile device 14 if a threshold ranking value has been achieved. The variable second portion 62 of the HMI 18 or mobile device 14 screen displays any of a variety of destination types or destinations as destination icons 64 as the trip randomization and gamification system 10 is manipulated by the user or operator. The controller 44 executes a third logic to select either the keyword access display bar or keyword function 56 or the randomized function 58 when the user or operator has selected the corresponding keyword function 56 or randomized function 58. The controller 44 then executes a fourth logic that presents information relating to the function selected by the user or operator on the HMI 18 or mobile device. In some examples, the information relating to the function selected includes proximity to the host vehicle 12, cost, directionality in relation to the host vehicle 12, and the like. The controller 44 then executes a fifth logic that receives a user input directing the destination selection system to select and/or navigate to a selected destination. In some aspects, the controller 44 then presents a status of the host vehicle 12 as the host vehicle 12 navigates to the selected destination.

Figures 3B, 4:
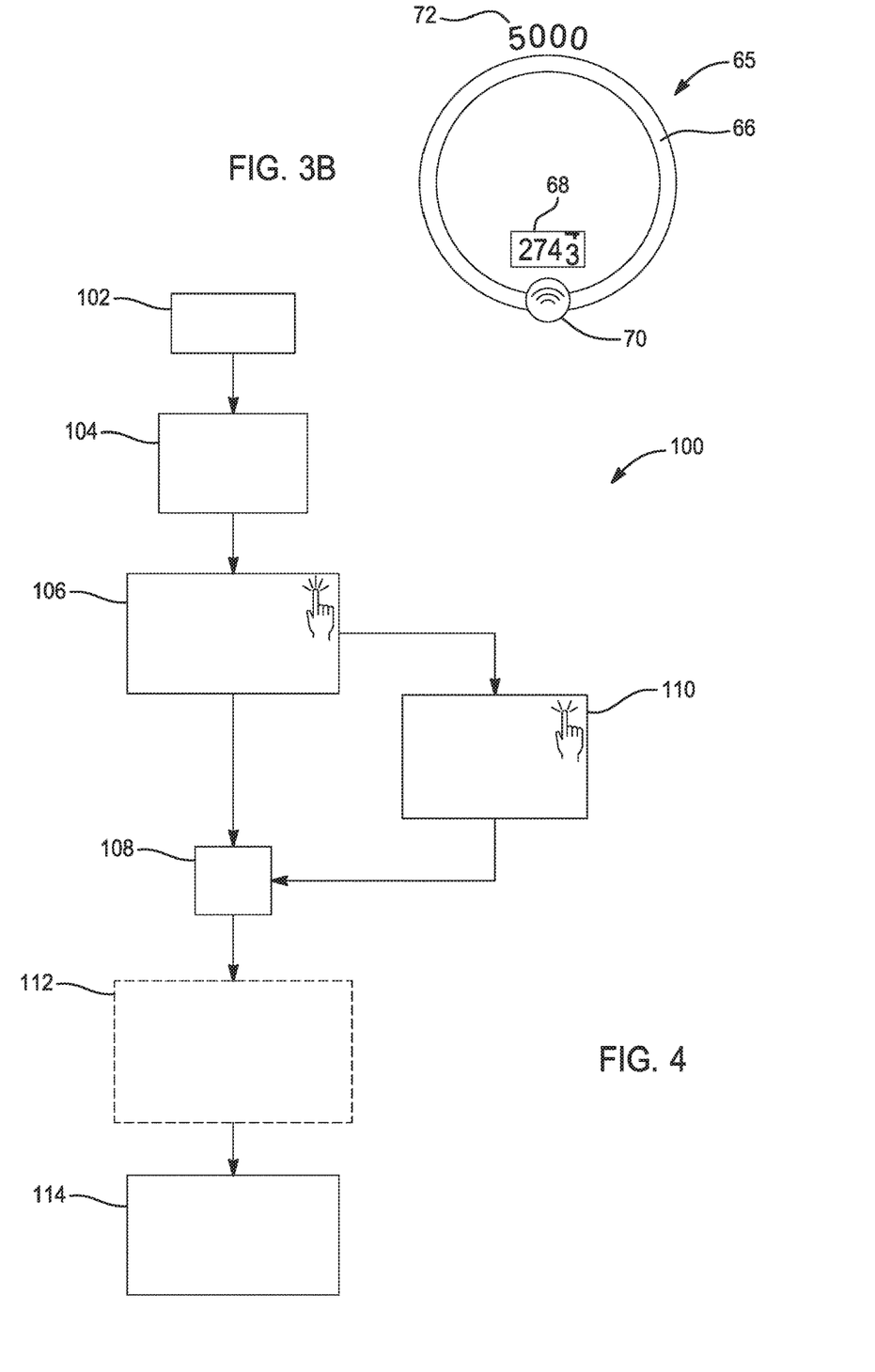
FIG. 3B is a detailed image of a destination icon of the destination selection system of FIG. 3A according to an aspect of the present disclosure.
FIG. 4 is a flowchart showing a method of using the destination selection system according to an aspect of the present disclosure.

Moreover, each of the destination icons 64 in the second portion 62 of the screen is actively sized and actively highlighted in accordance with the ranking of the destination represented by each destination icon 64. In one example, each of the destination types and/or destinations is represented as a substantially circular destination icon 64. The destination icons 64 are actively sized, highlighted, and distributed about the second portion 62 of the HMI 18 in accordance with the ranking. In one aspect, the size of each of the destination icons 64 is a representation of the overall predicted satisfaction of a user with the destination represented by the destination icons 64. In another aspect, the destination icons 64 are actively highlighted by the display of a glowing ring 66, or the like, surrounding each of the destination icons 64.

In some examples, the glowing ring 66 represents a social media-correlated characteristic of each destination represented by the destination icons 64. That is, the glowing ring represents for example, a popularity among the user's friends and like-minded people, or a "trending" quality to each of the destination icons 64. Additionally, in several aspects the glowing ring 66 provides the user/operator of the HMI 18 or the mobile device 14 an optical cue as to the type of destination represented by each destination icon 64. For example, each glowing ring 66 is colored according to the type of destination represented by the destination icon 64. A destination icon 64 for a national park might therefore have a green-colored glowing ring 66, while a destination icon 64 for a lake might have a blue-colored glowing ring 66, and a destination icon 64 for an office building might have a gray glowing ring 66. While the glowing rings 66 have been variously described above as being green, blue, or gray in color, it should be understood that the colors mentioned are merely examples of how the glowing rings 66 might be colored. Any quantity of colors and shades thereof could be used with the glowing rings 66 without departing from the scope or intent of the present disclosure. In fact, in some aspects the colors of the glowing rings 66 are user and/or manufacturer selected, and can be customized to match or fit the host vehicle 12 interior and/or exterior color scheme. Moreover, the glowing rings 66 may include patterns, such as stripes, checks, chevrons, plaid, organic shapes such as leaves, or the like, and the glowing rings 66 may have shapes other than the aforementioned substantially circular shape without departing from the scope or intent of the present disclosure. In some examples, the glowing rings 66 provide further indications of interest via additional highlighting for certain destination icons 64 whose rankings suggest strong appeal to the user/operator. That is, the glowing rings 66 may increase or decrease brightness, flash, pulse, rotate, or the like to draw the user/operator's attention. Put another way, in some examples, the glowing ring 66 is a dynamic visual feature that draws the user/operator's attention to certain of the destination icons 64 that the trip randomization and gamification system 10 has determined to be of particular interest based on ranking.

In some examples, an odometer, trip-odometer, or other such mileage counter 68 is depicted as a portion of the destination icons 64. The mileage counter 68 shows a distance traveled to the destination represented by the destination icon 64, or a distance to be traveled to the destination icon 64. In some aspects, the mileage counter 68 is a cumulative account of the distance traveled to all of the destinations represented by a given destination icon 64. That is, for example, a distance traveled to a particular musical venue is shown in the mileage counter 68. The distance traveled to the musical venue of the example may be the distance of a single trip, or an accumulation of distance traveled over a variety of different trips to the same musical venue, or both. While the mileage counter 68 is described as applying to a destination icon 64 associated with a musical venue, it should be appreciated that each of the destination icons 64 depicted in the HMI 18 or the mobile device 14 may include a mileage counter 68 without departing from the scope or intent of the present disclosure.

In further examples, the destination icons 64 are supplemented by badges 70. The badges 70 depict sources of information. For example, musical events that are associated with a particular purveyor of musical entertainment such as Spotify™, SiriusXM™, iTunes™, or the like. In some aspects, the badges 70 depict a particular emblem associated with the source of the information for the destination icons 64 with which the badges 70 are associated. Thus, for example, a concert by a musician that the user/operator's musical listening history in an application such as Spotify™ suggests would be of interest to the user/operator is highlighted in a destination icon 64 and tagged with a badge 70 showing that the source of the information is Spotify™. Moreover, the badges 70 may in some examples indicate a sponsorship arrangement with the destination represented by a given destination icon 64. Additionally, sponsorship arrangements may flow to the user/operator and/or to the host vehicle 12 manufacturer. That is, in some examples, the user/operator may have an account with a particular musical content provider such as Spotify™, and therefore sponsored destination icons 65 for which Spotify™ is the sponsor are frequently shown on the HMI 18 and/or mobile device 14. In other examples, the host vehicle 12 manufacturer has a corporate sponsorship arrangement with a musical content provider such as SiriusXM™, and therefore SiriusXM™ sponsored destination icons 65 are frequently shown on the HMI 18 and/or mobile device 14. While the above examples all generally relate to musical performances, venues, and the like, it should be understood that a wide variety of other destination types and badges 70 associated therewith may be used in the trip randomization and gamification system 10 without departing from the scope or intent of the present disclosure. For example, sponsored destination icons 65 for Starbucks™, McDonald's™ or the like may be used and displayed in the trip randomization and gamification system 10 in relation to food and beverage destinations.

In further examples, destination icons 64 are displayed with relation to product order history information relating to the user/operator. In one such example, the user/operator has a history of occasionally ordering $4.99 Warm and Prepared pizzas from a local pizzeria on the way home from work. The user/operator happens to work late on a Monday night, and misses his normal commute time home. When the user/operator uses the trip randomization and gamification system 10 to navigate to his home, the system 10 presents the user/operator with a destination icon 64 relating to the local pizzeria as a waypoint on the user/operator's commute home. In a further example, the user/operator leaves work early to run a variety of errands, including picking up dinner from the local pizzeria. The user/operator places an order for a $4.99 Warm and Prepared pizza from the pizzeria via the HMI 18 and then begins his errands. The trip randomization and gamification system selects a route to the various waypoint errand destinations, including a particular branch office of the local pizzeria so as to effectively provide the user/operator with the destinations he needs to visit, while optimizing his arrival at the pizzeria to ensure that the $4.99 pizza is indeed Warm, and Prepared. While in the above examples, the trip randomization and gamification system 10 is discussed with respect to food and beverage-based waypoints, the system 10 can be used to direct the user/operator to any of a wide variety of different destinations without departing from the scope or intent of the present disclosure.

In further examples, a points value 72 is assigned to certain of the destination icons 64. The points value 72 is associated with the destination type and with sponsorship information relating to the destination icons 64. That is, like airline frequent flyer miles or gas points accumulated at gas stations, by visiting certain sponsored destination icons 65, a user/operator accumulates points. The points value 72 may vary in accordance with distance traveled, expense, and so forth. In several aspects, once the user/operator has accumulated enough points relating to a particular destination type, the points can be redeemed for discounts or other such promotional offers relating to the particular destination or destination type represented by the relevant destination icon 64. In further examples, a single centralized random destination icon 74 performs a random selection function. When the user/operator selects the random destination icon 74, the trip randomization and gamification system 10 randomly selects a destination for the user/operator. By randomly selecting a destination, the trip randomization and gamification system 10 reduces user/operator fatigue and improves the variety of destinations that a user/operator visits while using the system 10. Moreover, by randomly selecting a destination for the user/operator, the potential for user/operator decision fatigue is substantially reduced.

Referring now to FIG. 4 and with continuing reference to FIGS. 1-3B, an example of the method of the operation of the trip randomization and gamification system 10 is shown in more detail and referenced generally by numeral 100. The method 100 begins at block 102 where a user/operator of the host vehicle 12 selects the trip randomization and gamification system 10 on the HMI 18 and/or the mobile device 14. At block 104, a plurality of potential destinations are presented in an iconized format. In several aspects, the plurality of potential destinations are displayed in both the first portion 60 and the second portion 62 of the HMI 18 or mobile device 14. In several aspects, the plurality of potential destinations are selected based on a variety of user-set parameters such as time and/or range limits, cost, online calendar information, or the like. In another aspect the plurality of potential destinations are presented in relation to vehicle and/or road conditions such as range or fuel range, availability of rest stops, vehicle or road maintenance conditions, traffic conditions, or the like. In a still further aspects, the plurality of potential destinations include public events, popular places, availability of promotions, and inferences based on application usage on the user's mobile device 14 or the HMI 18. In still further aspects, the plurality of potential destinations are selected based on social information relating to the user/operator such as "likes" and visits, travel and "likes" by contacts and/or friends, purchases, most listened to audio files, and the like.

At block 106, the user/operator views the plurality of potential destinations in the first portion 60 and the second portion 62 of the HMI 18 or mobile device 14 and selects a destination. In some aspects, the user/operator selects the desired destination by clicking on the relevant destination. The method 100 then proceeds to block 108 where the navigation system 36 of the host vehicle 12 is engaged to navigate to the selected destination. In some aspects, when the host vehicle 12 is equipped with autonomous driving features or functionality, the host vehicle 12 navigates to the selected destination autonomously, semi-autonomously, or manually, depending on the preferences of the user/operator. In some examples, when additional information relating to the selected destination is available within the trip randomization and gamification system, the method proceeds to block 110 before proceeding to block 108. At block 110, the HMI 18 or mobile device 14 displays partner tie-ins, hotel booking information, restaurants, discounts, historical information, landmarks, statistics, associated with the selected destination. In further aspects, depending on the preferences of the user/operator, at block 108 the trip randomization and gamification system sets audio-visual systems to produce sound and/or lighting within the host vehicle 12 that is relevant to the destination selected. In one example, if the selected destination is a baseball park, the audio system plays music and/or radio associated with the sport of baseball while the host vehicle 12 is navigating to the baseball park.

At block 112, after the host vehicle 12 has navigated to the selected destination, the trip randomization and gamification system 10 selectively presents a survey on the HMI 18 or the mobile device 14. In several aspects, the survey is a brief questionnaire requesting feedback from the user/operator as to the relative success of the trip randomization and gamification system 10. From a technical perspective, the user/operator feedback received by the survey is used to refine the plurality of potential destinations displayed in the second portion 62 of the HMI 18 or mobile device 14 at block 104. However, because certain destinations may already have been the subject of surveys, and because of the potential to frustrate the user/operator if always presented with a survey at the end of a trip, the method 100 does not always request feedback from the user/operator. However, once survey feedback has been received at block 112, the method 100 combines user/operator feedback with usage history and the like to refine the results of ensuing trips taken while using the trip randomization and gamification system 10. At block 114, the method 100 ends and.

Figure 5:
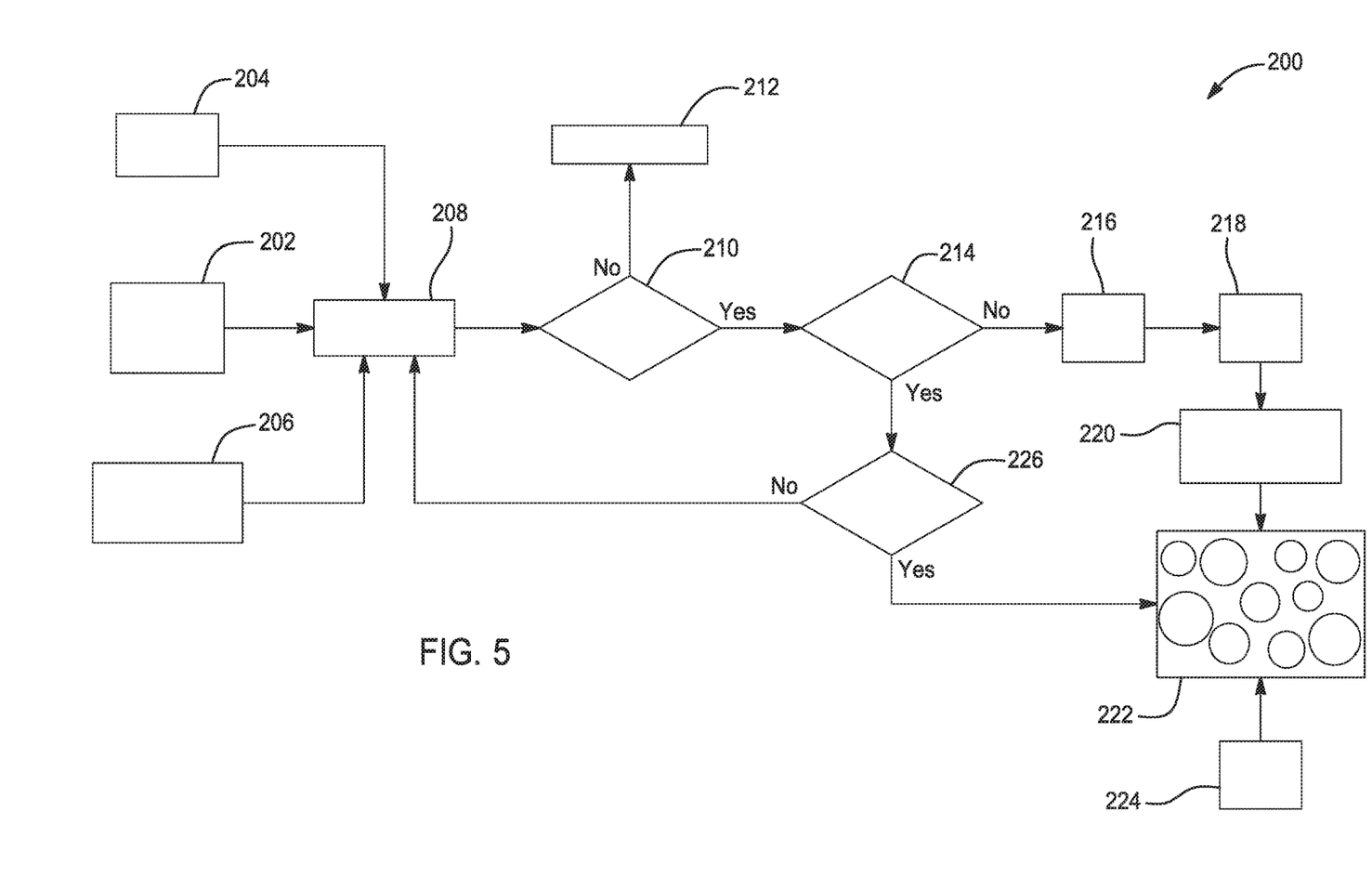
FIG. 5 is a flowchart showing a method of improving destination options within a destination selection system according to an aspect of the present disclosure.

Referring now to FIG. 5, and with continuing reference to FIGS. 1-4, an example of the method of the operation of the trip randomization and gamification system 10 is shown in more detail and referenced generally by numeral 200. The method 200 begins at block 202. At block 202 the system 10 receives a mode selection from the user/operator. The mode selection is a selection of either the keyword function 56 or the randomized function 58. The method then proceeds to blocks 204 and 206 contemporaneously. At block 204, the system 10 determines event factors such as the availability of public events, popular places, promotional information, and user application usage. At block 206, the system 10 determines ranking and filtration factors. The ranking and filtration factors include user parameters such as range and time limits, cost, calendar availability and the like. In addition, the ranking and filtration factors include vehicle and road information factors such as range, fueling, rest stops, vehicle and/or road maintenance conditions, and the like. User inferences such as user social media likes and visits, friend information, purchases, most commonly listened to or watched items, or the like are also included as part of the ranking and filtration factors.

The ranking and filtration factors from block 206 are combined with the event factors from block 204 at block 208 in a series of calculations. The calculations generate overall rankings for each of a variety of potential destinations that fulfill the requirements of blocks 202, 204, and 206. For example, at block 208 the overall ranking for each of the potential destinations is a combination of a sum of distance from the host vehicle 12 multiplied by a first coefficient and a first entropy factor; travel time and/or host vehicle 12 range multiplied by a second coefficient and a second entropy factor; monetary or other cost multiplied by a third coefficient and a third entropy factor; and social information multiplied by a fourth coefficient and a fourth entropy factor. In several aspects, the first, second, third, and fourth coefficients are variable and relate to the particular preferences of a particular user, while the first, second, third, and fourth entropy factors provide a variable degree of randomness as to which of a selection of destinations might be selected to be shown as destination icons 64 at a given point in time. That is, in an example in which the keyword function 56 is used, distance, cost, and time-based coefficients are given heavier weight than certain other coefficients like preferences of friends. By comparison, when the randomized function 58 is used, the preferences of friends are given more weight than time, distance, and cost factors. The entropy factors effectively randomize the selection of destination icons 64 within some predetermined limits based on the user/operator history. The entropy factors generally ensure that the user/operator does not always see the same destinations reflected in the destination icons 64 in the system 10.

The method 200 then proceeds to block 210 where the system 10 determines whether a predetermined threshold ranking value has been met for each of the potential destinations. If the threshold ranking value has not been met by a particular destination, the destination is discarded at block 212. For example, if the user wants to visit a coffee shop, but a potential coffee shop destination is 250 miles away, the destination will be discarded as falling outside the user's parameters or the like. However, if at block 210, the threshold ranking value has been achieved, the method proceeds to block 214 where the system 10 determines if the potential destination results are improving. That is, at block 214, the system 10 continuously and recursively checks to see if the destination possibilities are getting closer and closer to ideal user parameters, vehicle and road parameters, user inferences, and the like. In order to reduce processing time and/or resource usage, the continuous and recursive checks performed at block 214 may be limited to a predetermined number of logical loops. If the results are no longer improving at block 214, the method proceeds to block 216 where a ranking is assigned to each of the potential destinations for which the results are no longer improving. At block 218, the destinations from block 216 are selected to be displayed as destination icons 64 on the HMI 18 or mobile device 14. Moreover, the destination icons 64 are scaled in accordance with ranking and optimally placed about the HMI 18 or mobile device screen 14 at block 220. For example, to optimally place the destination icons 64, the system 10 selects portions of the HMI 18 or mobile device screen 14 that are easiest for the user/operator to access and/or see and assigns the most highly ranked destination icons 64 to that space, whereas lower ranked icons are placed in areas of the HMI 18 or mobile device screen 14 that are somewhat harder to physically reach or see. The method 200 then proceeds to block 222 where each of the destinations from block 216 are shown as destination icons 64 on the HMI 18 or mobile device screen 14. Metadata, such as live-updating traffic, weather, or other like conditions are then accumulated at block 224 and combined with the destination icons 64 displayed at block 222 to actively update and alter the appearance of the displayed destination icons 64 and/or waypoint destination icons 64s.

Referring once more to block 214 if the results are still improving, the method proceeds to block 226 where the system 10 determines if the predetermined logical loop limit has been reached. If the logical loop limit has not been reached, the method 200 returns to block 208 where the calculations are performed once more. However, when the logical loop limit has been reached, the method proceeds to block 222 where even though a necessary ranking threshold has not been met, destinations are still displayed on the HMI 18 or mobile device 14 screen in relation to the destination icons 64. In other words, if the system 10 cannot, within the predetermined logical loop limit, find enough destination possibilities that achieve a high enough ranking to overcome the threshold ranking value, destinations are still selected for display. By still displaying a selection of destination icons 64 the user/operator is not faced with zero results, nor an excessive delay before results appear. Moreover, excessive consumption of computational processing power is avoided.

Figure 6:
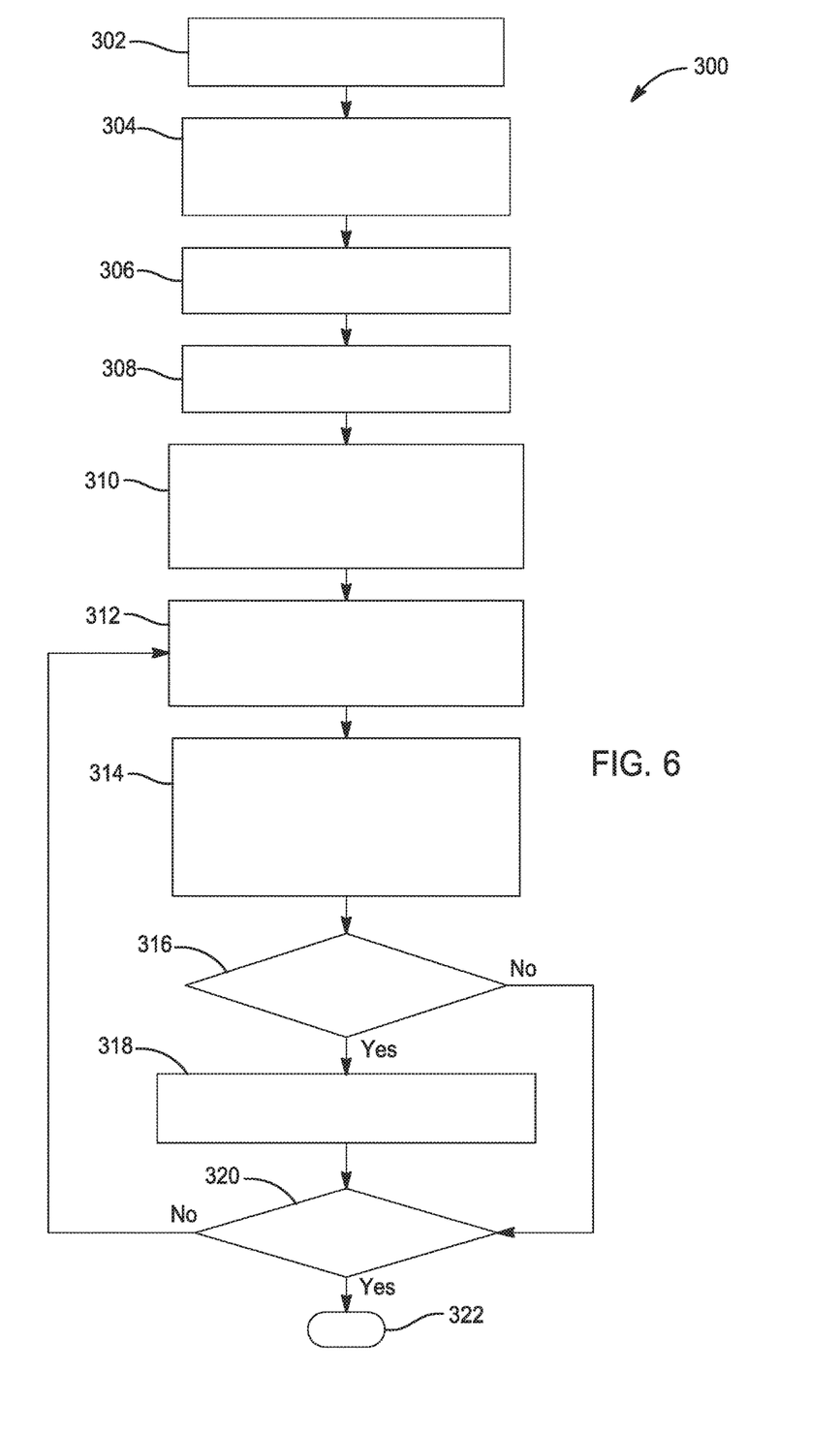
FIG. 6 is a flowchart showing a visual alert of the destination selection system according to an aspect of the present disclosure.

Referring now to FIG. 6, and with continuing reference to FIGS. 1-5, an example of the operation of the method 200 of FIG. 5 is shown and generally referenced by the numeral 300. The method 300 begins at block 302 where a user/operator mobile device 14 communicates wirelessly with the HMI 18. In the communication, the mobile device 14 synchronizes the user/operator calendar entries, social media account information, and the like. The method 300 then proceeds to block 304 where the user/operator is identified by the trip randomization and gamification system 10. That is, at block 304, the particular user/operator is identified by how the user/operator has historically used the trip randomization and gamification system 10, social media characteristics, by account information, or the like. At block 306, the trip randomization and gamification system 10 receives the preferences of the user/operator from the historical system 10 use, social media characteristics, account information, or the like. At block 308, the trip randomization and gamification system 10 receives an input from the user/operator selecting a destination via the HMI 18 or the mobile device 14 interface. At block 310, the trip randomization and gamification system 10 outputs one or more points of interest via destination icons 64 based on selected destination and user/operator and/or passenger preferences. At block 312, the sizes of the destination icons 64 are actively increased as the host vehicle 12 approaches the destinations represented by the destination icons 64. At block 314 the destination icons 64 are highlighted in accordance with social media information such as friend likes, favorites, and other such trending characteristics. At block 316 the system 10 determines if the host vehicle 12 is moving away from the destinations represented by the destination icons 64. If the host vehicle 12 is moving away from the destinations, the method 300 proceeds to block 318 where as the host vehicle 12 moves away from the destinations represented by the destination icons 64, the destination icons 64 are actively decreased in size. If, however, the host vehicle 12 is not moving away from the destinations represented on the HMI 18 or the mobile device 14, the method proceeds to block 320 where the system 10 determines if the host vehicle 12 has arrived at the destination represented by a given destination icon 64. If the host vehicle 12 has arrived at the destination represented by a destination icon 64 the method 300 proceeds to block 322 where the method 300 ends. However, if the host vehicle 12 has not arrived at a given destination, and the host vehicle 12 is not moving away from the given destination the method 300 proceeds back to block 312 where the size of the destination icon 64 for the given destination is increased again, as the host vehicle 12 travels towards the given destination.

A system and method for trip randomization and gamification of the present disclosure offers several advantages. These include increasing the utility of the HMI 18 and mobile devices 14 used by user/operators of the host vehicle 12, decreasing trip planning time, increasing trip spontaneity, improving visual notification, increasing the social connections between user/operators, and providing marketing opportunities for both the host vehicle manufacturer and sponsor organizations.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A destination selection system for determining travel destinations comprising:
   a human-machine interface (HMI);
   a positioning system in communication with the HMI;
   a controller in communication with the HMI and the positioning system, the controller having a processor, and a memory, the processor executing programmatic logic stored in the memory, the programmatic logic comprising:
      a first logic to display an icon on the HMI based on position data received from the positioning system; wherein the first logic further comprises
   calculating a ranking for each of the plurality of destination icons;
   determining if a threshold ranking value has been achieved;
   displaying destination icons if the threshold ranking value has been achieved;
   a second logic for sizing the icon based on at least one of the position data and one or more additional factors, and in response to at least one of the position data and one or more additional factors actively and continuously resizing the icon;
   a third logic for receiving a first user input accessing the destination selection system within the HMI;
   a fourth logic for presenting a destination selection management interface having at least two selectable functions including a keyword function and a randomization function; wherein the fourth logic further comprises selectively presenting a plurality of destination icons relating to the selected function and selectively highlighting the plurality of destination icons based on host vehicle user preferences;
   a fifth logic for receiving a second user input to select one of the at least two functions of the destination selection management interface;
   a sixth logic for presenting on the HMI information relating to the selected function;
   a seventh logic for receiving a third user input to direct the destination selection system to select a destination; and
   an eighth logic for presenting a status of a host vehicle as the host vehicle navigates to the selected destination, wherein the fourth logic further comprises selectively presenting a plurality of destination icons relating to the selected function and selectively highlighting the plurality of destination icons based on host vehicle user preferences.

2. The destination selection system of claim 1 wherein the third logic further comprises selecting the destination selection system in the HMI of the host vehicle or selecting a destination selection system on a mobile device.

3. The destination selection system of claim 1 wherein the third user input further comprises selection of a destination icon displayed in the destination selection system.

4. The destination selection system of claim 1 wherein the eighth logic further comprises selectively displaying map information, the destination selection interface, or the destination selection system, including points of interest actively, recursively, and continuously sized, resized and highlighted in relationship to proximity to the host vehicle.

5. The destination selection system of claim 1 wherein the host vehicle user preferences further comprise manually selected preferences and automatically generated preferences, and wherein the automatically generated preferences further comprise destination types selected in relationship to usage history, present location, route usage, social information, vehicle range information, vehicle maintenance information, traffic conditions, event information, promotional information, landmarks, time of day, housing information, and product order history information.

6. The destination selection system of claim 1 wherein the second logic further comprises:
   calculating a sum of:
   distance multiplied by a first coefficient and a first entropy factor;
   time multiplied by a second coefficient and a second entropy factor;
   cost multiplied by a third coefficient and a third entropy factor;
   social information multiplied by a fourth coefficient and a fourth entropy factor;
   filtering the plurality of destination icons based on plurality of user factors, vehicle and road factors, user inferences, and events available; and
   wherein the second logic further comprises:
   actively sizing and actively highlighting the displayed destination icons in accordance with the ranking of each of the displayed destination icons.

7. A method for determining travel destinations for a host vehicle comprises:
   receiving a first user input to access a destination selection system, the destination selection system having a controller in communication with a human-machine interface (HMI) and a positioning system, the controller having a processor and a memory, the processor executing programmatic logic stored in the memory, the programmatic logic including steps for:
   displaying a plurality of icons on the HMI based on position data received from the positioning system;
   presenting a destination selection management interface having at least two selectable functions including a keyword function and a randomization function; including selectively presenting a plurality of destination icons relating to the selected function and selectively highlighting the plurality of destination icons based on host vehicle user preferences;
   calculating a ranking for each of the plurality of destination icons;
   determining if a threshold ranking value has been achieved;

displaying destination icons if the threshold ranking value has been achieved; and actively sizing, resizing, and actively highlighting the displayed destination icons in accordance with the ranking of each of the displayed destination icons;

receiving a second user input to select one of the at least two functions of the destination selection system;

presenting information relating to the selected function;

receiving a third user input to direct the destination selection system to select a destination;

presenting a status of the host vehicle as the host vehicle navigates to the selected destination.

8. The method of claim 7 wherein receiving the first user input further comprises selecting a destination selection system in the HMI of the host vehicle or selecting a destination selection system on a mobile device.

9. The method of claim 7 wherein calculating a ranking further comprises calculating a sum of:
   distance multiplied by a first coefficient and a first entropy factor;
   time multiplied by a second coefficient and a second entropy factor;
   cost multiplied by a third coefficient and a third entropy factor;
   social information multiplied by a fourth coefficient and a fourth entropy factor; and
   filtering the plurality of destination icons based on plurality of user factors, vehicle and road factors, user inferences, and events available.

10. The method of claim 7 wherein the host vehicle user preferences further comprise manually selected preferences and automatically generated preferences.

11. The method of claim 10 wherein the automatically generated preferences further comprise destination types selected in relationship to usage history, present location, route usage, social information, vehicle range information, vehicle maintenance information, traffic conditions, event information, promotional information, landmarks, time of day, housing information, and product order history information.

12. The method of claim 7 wherein receiving a third user input further comprises selecting a destination icon displayed in the destination selection system.

13. The method of claim 7 wherein presenting a status of the host vehicle as the host vehicle performs the selected function further comprises selectively displaying map information, the destination selection interface, or the destination selection system, including points of interest actively, recursively, and continuously sized, resized, and highlighted in relationship to rankings of each of the points of interest.

14. A method for determining travel destinations for a host vehicle comprises:
   receiving a first user input to access a destination selection system in a human-machine interface (HMI) of the host vehicle or selecting a destination selection system on a mobile device, the destination selection system having a controller in communication with a human-machine interface (HMI) and a positioning system, the controller having a processor and a memory, the processor executing programmatic logic stored in the memory, the programmatic logic including steps for:

presenting a destination selection management interface having at least two selectable functions including a keyword function and a randomization function;

receiving a second user input to select one of the at least two functions of the destination selection management interface, displaying a plurality of destination icons on the HMI based on position data received from the positioning system; selectively presenting the plurality of destination icons relating to the selected function and selectively highlighting the plurality of destination icons based on host vehicle user preferences, the host vehicle user preferences including manually selected preferences and automatically generated preferences;

calculating a ranking for each of the plurality of destination icons;

determining if a threshold ranking value has been achieved;

displaying destination icons if the threshold ranking value has been achieved; and highlighting the displayed destination icons in accordance with the ranking of each of the displayed destination icons;

presenting information relating to the selected function;

receiving a third user input to direct the destination selection system to select a destination by selecting a destination icon displayed in the destination selection system;

presenting a status of the host vehicle as the host vehicle navigates to the selected destination including selectively displaying map information, the destination selection interface, or the destination selection system, including points of interest actively and continuously sized, resized, and highlighted in relationship to proximity to the host vehicle, wherein calculating a ranking further comprises calculating a sum of:
      distance multiplied by a first coefficient and a first entropy factor;
      time multiplied by a second coefficient and a second entropy factor;
      cost multiplied by a third coefficient and a third entropy factor;
      social information multiplied by a fourth coefficient and a fourth entropy factor; and
      filtering the plurality of destination icons based on plurality of user factors, vehicle and road factors, user inferences, and events available.

15. The method of claim 14 wherein the automatically generated preferences further comprise: destination types selected in relationship to usage history, present location, route usage, social information, vehicle range information, vehicle maintenance information, traffic conditions, event information, promotional information, landmarks, time of day, housing information, and product order history information, and wherein the actively and continuously sized and highlighted points of interest are continuously and recursively resized and highlighted in relation to the ranking of each of the points of interest.

* * * * *